United States Patent
Chu

(10) Patent No.: US 10,013,205 B2
(45) Date of Patent: Jul. 3, 2018

(54) MEMORY MIGRATION METHOD AND DEVICE

(71) Applicant: Huawei Technologies Co., Ltd., Shenzhen (CN)

(72) Inventor: Lixing Chu, Warsaw (PL)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 96 days.

(21) Appl. No.: 15/357,240

(22) Filed: Nov. 21, 2016

(65) Prior Publication Data

US 2017/0068486 A1 Mar. 9, 2017

Related U.S. Application Data

(63) Continuation of application No. PCT/CN2015/080491, filed on Jun. 1, 2015.

(30) Foreign Application Priority Data

Sep. 12, 2014 (CN) .......................... 2014 1 0464534

(51) Int. Cl.
*G06F 13/00* (2006.01)
*G06F 3/06* (2006.01)
(Continued)

(52) U.S. Cl.
CPC .............. *G06F 3/0647* (2013.01); *G06F 3/06* (2013.01); *G06F 3/064* (2013.01); *G06F 3/0619* (2013.01);
(Continued)

(58) Field of Classification Search
None
See application file for complete search history.

(56) References Cited

U.S. PATENT DOCUMENTS

| | | | |
|---|---|---|---|
| 5,727,150 A | 3/1998 | Laudon et al. | |
| 5,918,249 A | 6/1999 | Cox et al. | |

(Continued)

FOREIGN PATENT DOCUMENTS

| | | |
|---|---|---|
| CN | 100383763 C | 4/2008 |
| CN | 102135963 A | 7/2011 |

(Continued)

OTHER PUBLICATIONS

Machine Translation and Abstract of Chinese Publication No. CN104216784, Dec. 17, 2014, 44 pages.

(Continued)

*Primary Examiner* — Sean D Rossiter
(74) *Attorney, Agent, or Firm* — Conley Rose, P.C.

(57) ABSTRACT

A memory migration method and device relate to the field of computer application technologies. A memory page is combined into a memory block, which reduces a quantity of migrations, and improves central processing unit (CPU) utilization. The method includes receiving, by a first node, a migration instruction sent by a second node, sequentially scanning each memory page between a physical address of a start memory page accessed by a target process and a physical address of an end memory page accessed by the target process, where the memory page is a memory page accessed by the target process or a memory page accessed by a non-target process, determining whether each memory page meets a block combination condition, combining a memory page that meets the block combination condition into a corresponding memory block, and migrating the corresponding memory block to a memory area of the second node.

24 Claims, 5 Drawing Sheets

(51) Int. Cl.
  *G06F 12/06*  (2006.01)
  *G06F 12/0813*  (2016.01)
  *G06F 9/50*  (2006.01)

(52) U.S. Cl.
  CPC .......... *G06F 3/0644* (2013.01); *G06F 3/0683* (2013.01); *G06F 9/50* (2013.01); *G06F 9/5033* (2013.01); *G06F 12/06* (2013.01); *G06F 12/0813* (2013.01); *G06F 2212/2542* (2013.01)

(56) References Cited

U.S. PATENT DOCUMENTS

| | | | |
|---|---|---|---|
| 8,966,204 | B2 | 2/2015 | Chang et al. |
| 9,081,764 | B2 | 7/2015 | Arroyo et al. |
| 9,436,402 | B1* | 9/2016 | De Santis ............. G06F 3/0628 |
| 9,779,015 | B1* | 10/2017 | Oikarinen ............... G06F 12/02 |
| 2002/0129115 | A1* | 9/2002 | Noordergraaf ...... G06F 12/0813 709/213 |
| 2004/0160960 | A1* | 8/2004 | Monta .............. H04N 21/23406 370/395.4 |
| 2009/0313445 | A1 | 12/2009 | Pandey et al. |
| 2011/0145471 | A1 | 6/2011 | Corry et al. |
| 2012/0198187 | A1 | 8/2012 | Accapadi et al. |
| 2013/0311705 | A1* | 11/2013 | Cheng ................ G06F 12/0246 711/103 |
| 2014/0244891 | A1* | 8/2014 | Tsirkin .................. G06F 9/5077 711/6 |
| 2014/0304453 | A1* | 10/2014 | Shao .................. G06F 12/0246 711/103 |
| 2015/0277802 | A1* | 10/2015 | Oikarinen ............. G06F 3/0631 711/114 |
| 2016/0021613 | A1* | 1/2016 | Mani ................. H04W 52/0209 370/311 |
| 2017/0168736 | A1* | 6/2017 | Batra .................... G06F 3/0619 |
| 2017/0337972 | A1* | 11/2017 | Lee ........................ G11C 16/16 |
| 2018/0074701 | A1* | 3/2018 | Chang .................. G06F 3/0616 |

FOREIGN PATENT DOCUMENTS

| | | |
|---|---|---|
| CN | 102326149 A | 1/2012 |
| CN | 102999437 A | 3/2013 |
| CN | 103198028 A | 7/2013 |
| CN | 103324582 A | 9/2013 |
| CN | 103324592 A | 9/2013 |
| CN | 103353850 A | 10/2013 |
| CN | 103365704 A | 10/2013 |
| CN | 103605564 A | 2/2014 |
| CN | 104216784 A | 12/2014 |
| EP | 2437168 A | 4/2012 |
| WO | 9635169 A1 | 11/1996 |

OTHER PUBLICATIONS

Foreign Communication From a Counterpart Application, Chinese Application No. 201410464534.X, Chinese Office Action dated Dec. 4, 2017, 7 pages.
Machine Translation and Abstract of Chinese Publication No. CN103353850, Oct. 16, 2013, 18 pages.
Machine Translation and Abstract of Chinese Publication No. CN100383763, Apr. 23, 2008, 13 pages.
Machine Translation and Abstract of Chinese Publication No. CN102135963, Jul. 27, 2011, 7 pages.
Machine Translation and Abstract of Chinese Publication No. CN103198028, Jul. 10, 2013, 20 pages.
Machine Translation and Abstract of Chinese Publication No. CN103324582, Sep. 25, 2013, 30 pages.
Machine Translation and Abstract of Chinese Publication No. CN103324592, Sep. 25, 2013, 24 pages.
Machine Translation and Abstract of Chinese Publication No. CN103365704, Oct. 23, 2013, 11 pages.
Foreign Communication From a Counterpart Application, European Application No. 15840667.8, Extended European Search Report dated May 17, 2017, 10 pages.
Foreign Communication From a Counterpart Application, PCT Application No. PCT/CN2015/080491, English Translation of International Search Report dated Aug. 24, 2015, 2 pages.
Foreign Communication From a Counterpart Application, PCT Application No. PCT/CN2015/080491, English Translation of Written Opinion dated Aug. 24, 2015, 6 pages.

* cited by examiner

MEMORY MIGRATION METHOD AND DEVICE

CROSS-REFERENCE TO RELATED APPLICATIONS

This application is a continuation of International Application No. PCT/CN2015/080491, filed on Jun. 1, 2015, which claims priority to Chinese Patent Application No. 201410464534.X, filed on Sep. 12, 2014. The disclosures of the aforementioned applications are hereby incorporated by reference in their entireties.

TECHNICAL FIELD

The present disclosure relates to the field of computer application technologies, and in particular, to a memory migration method and device.

BACKGROUND

A non-uniform memory access (NUMA) system architecture is one of server architectures. FIG. 1 is a schematic diagram of a NUMA system architecture. As shown in FIG. 1, the NUMA architecture includes multiple nodes, and each node includes one central processing unit (CPU) and a memory area corresponding to the CPU, where data in the memory area is stored using a memory page as a smallest unit. In the NUMA architecture, each CPU may access data in a local memory area, or may access data in a memory area of another node (that is, a non-local memory area). Because of an increase in a quantity of nodes and different designs of buses, lengths of memory access links are different. Consequently, a time taken by a CPU to access a non-local memory area is far greater than a time taken by the CPU to access a local memory area. To resolve a problem that in the NUMA architecture, a CPU in a node takes a relatively long time to access a remote memory area, data in the remote memory area needs to be migrated from the remote memory area to a local memory area.

In other approaches, a memory page is generally used as a unit for migrating data in a remote memory area to a local memory area. Because a memory page is used as a unit for memory migration, a quantity of migrations is the same as a quantity of memory pages that need to be migrated. In this case, if many memory pages need to be migrated, a relatively large quantity of migrations is caused. As a result, CPU usage is relatively large, and system performance is relatively low.

SUMMARY

Embodiments of the present disclosure provide a memory migration method and device, which resolve a problem of relatively large CPU usage resulted from a relatively large quantity of migrations caused when a large quantity of memory pages needs to be migrated and a memory page is used as a unit for memory migration.

To achieve the foregoing objective, the technical solutions used in the present disclosure are as follows.

According to a first aspect, an embodiment of the present disclosure provides a memory migration method, including receiving, by a first node, a migration instruction sent by a second node, where the migration instruction is used to instruct to migrate, from a memory area of the first node to a memory area of the second node, all memory pages located on the first node and accessed by a target process, and the target process is a process running on the second node, sequentially scanning, by the first node, each memory page between a physical address of a start memory page accessed by the target process and a physical address of an end memory page accessed by the target process, where the memory page is a memory page accessed by the target process or a memory page accessed by a non-target process, determining, by the first node, whether each memory page meets a block combination condition, combining a memory page that meets the block combination condition into a corresponding memory block, and migrating, by the first node, the corresponding memory block to the memory area of the second node.

With reference to the first aspect, in a first possible implementation manner of the first aspect, the memory page that meets the block combination condition includes a memory page accessed by the target process, or an idle memory page, or a memory page accessed by a first process, where the first process is a process, running on the second node, other than the target process.

With reference to the first aspect or the first possible implementation manner of the first aspect, in a second possible implementation manner of the first aspect, when a memory page is a memory page accessed by a second process, where the second process is a process running on a third node, determining whether the memory page meets a block combination condition includes querying a distance relationship table stored inside an operating system, where the distance relationship table records a distance at which the third node accesses the memory area of the first node, and a distance at which the third node accesses the memory area of the second node, determining whether the distance at which the third node accesses the memory area of the second node is less than or equal to the distance at which the third node accesses the memory area of the first node, and determining that the memory page meets the block combination condition if the distance at which the third node accesses the memory area of the second node is less than or equal to the distance at which the third node accesses the memory area of the first node.

With reference to any one of the first aspect, or the first to the second possible implementation manners of the first aspect, in a third possible implementation manner of the first aspect, for a first memory page, when the first memory page meets the block combination condition, combining the first memory page into a corresponding memory block includes determining whether a quantity of memory pages included in a first memory block is less than a preset threshold, and combining the first memory page into the first memory block if the quantity of memory pages included in the first memory block is less than the preset threshold, or combining the first memory page used as a start memory page of a second memory block into the second memory block if the quantity of memory pages included in the first memory block is equal to the preset threshold and the first memory page is a memory page accessed by the target process, where the first memory page is any memory page, in the memory area of the first node, between the physical address of the start memory page accessed by the target process and the physical address of the end memory page accessed by the target process, and the first memory block is a memory block to which a previous memory page adjacent to the first memory page belongs.

With reference to the third possible implementation manner of the first aspect, in a fourth possible implementation manner of the first aspect, if the first memory page does not meet the block combination condition, or if the quantity of memory pages included in the first memory block is equal to the preset threshold and the first memory page is a memory page accessed by the non-target process, the method further includes determining whether a second memory page is a memory page accessed by the target process, where the second memory page is a next memory page adjacent to the first memory page, and combining the second memory page used as a start memory page of a third memory block into the third memory block if the second memory page is a memory page accessed by the target process.

According to a second aspect, an embodiment of the present disclosure provides a memory migration device, including a receiving unit configured to receive a migration instruction sent by a second node, where the migration instruction is used to instruct to migrate, from a memory area of a first node to a memory area of the second node, all memory pages located on the first node and accessed by a target process, and the target process is a process running on the second node, a scanning unit configured to sequentially scan, according to the migration instruction received by the receiving unit, each memory page between a physical address of a start memory page accessed by the target process and a physical address of an end memory page accessed by the target process, where the memory page is a memory page accessed by the target process or a memory page accessed by a non-target process, a determining unit configured to determine whether each memory page meets a block combination condition, a block combination unit configured to combine a memory page that meets the block combination condition and that is determined by the determining unit into a corresponding memory block, and a sending unit configured to migrate the corresponding memory block to the memory area of the second node.

With reference to the second aspect, in a first possible implementation manner of the second aspect, the memory page that meets the block combination condition and that is accessed by the non-target process includes a memory page accessed by the target process, or an idle memory page, or a memory page accessed by a first process, where the first process is a process, running on the second node, other than the target process.

With reference to the second aspect or the first possible implementation manner of the second aspect, in a second possible implementation manner of the second aspect, when a memory page is a memory page accessed by a second process, where the second process is a process running on a third node, the determining unit is configured to query a distance relationship table stored inside an operating system, where the distance relationship table records a distance at which the third node accesses the memory area of the first node, and a distance at which the third node accesses the memory area of the second node, determine whether the distance at which the third node accesses the memory area of the second node is less than or equal to the distance at which the third node accesses the memory area of the first node, and determine that the memory page meets the block combination condition if the distance at which the third node accesses the memory area of the second node is less than or equal to the distance at which the third node accesses the memory area of the first node.

With reference to any one of the second aspect, or the first to the second possible implementation manners of the second aspect, in a third possible implementation manner of the second aspect, for a first memory page, when the determining unit determines that the first memory page meets the block combination condition, the block combination unit is configured to determine whether a quantity of memory pages included in a first memory block is less than a preset threshold, and combine the first memory page into the first memory block if the quantity of memory pages included in the first memory block is less than the preset threshold, or combine the first memory page used as a start memory page of a second memory block into the second memory block if the quantity of memory pages included in the first memory block is equal to the preset threshold and the first memory page is a memory page accessed by the target process, where the first memory page is any memory page, in the memory area of the first node, between the physical address of the start memory page accessed by the target process and the physical address of the end memory page accessed by the target process, and the first memory block is a memory block to which a previous memory page adjacent to the first memory page belongs.

With reference to the third possible implementation manner of the second aspect, in a fourth possible implementation manner of the second aspect, if the determining unit determines that the first memory page does not meet the block combination condition, or if the block combination unit determines that the quantity of memory pages included in the first memory block is equal to the preset threshold and the first memory page is a memory page accessed by the non-target process, correspondingly, the determining unit is further configured to determine whether a second memory page is a memory page accessed by the target process, where the second memory page is a next memory page adjacent to the first memory page, and the block combination unit is further configured to combine the second memory page used as a start memory page of a third memory block into the third memory block if the second memory page is a memory page accessed by the target process.

It can be learnt from the foregoing description that, the embodiments of the present disclosure provide a memory migration method and device. The method includes receiving, by a first node, a migration instruction sent by a second node, sequentially scanning each memory page between a physical address of a start memory page accessed by a target process and a physical address of an end memory page accessed by the target process, where the memory page is a memory page accessed by the target process or a memory page accessed by a non-target process, combining a memory page that meets a block combination condition into a corresponding memory block, and migrating the corresponding memory block to a memory area of the second node, where the memory page that meets the block combination condition includes a memory page accessed by the target process or a memory page accessed by the non-target process. In this way, memory pages accessed by the target process and some memory pages that meet the block combination condition and that are accessed by the non-target process are combined into a corresponding memory block. Therefore, on the premise of not increasing performance costs of a system, discrete memory pages are combined together as many as possible for migration in a unit of memory block, which significantly reduces a quantity of memory migrations, and improves CPU utilization.

BRIEF DESCRIPTION OF DRAWINGS

To describe the technical solutions in the embodiments of the present disclosure more clearly, the following briefly describes the accompanying drawings required for describing the embodiments.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by persons of ordinary skill in the art based on the embodiments of the present disclosure without creative efforts shall fall within the protection scope of the present disclosure.

Figure 1:
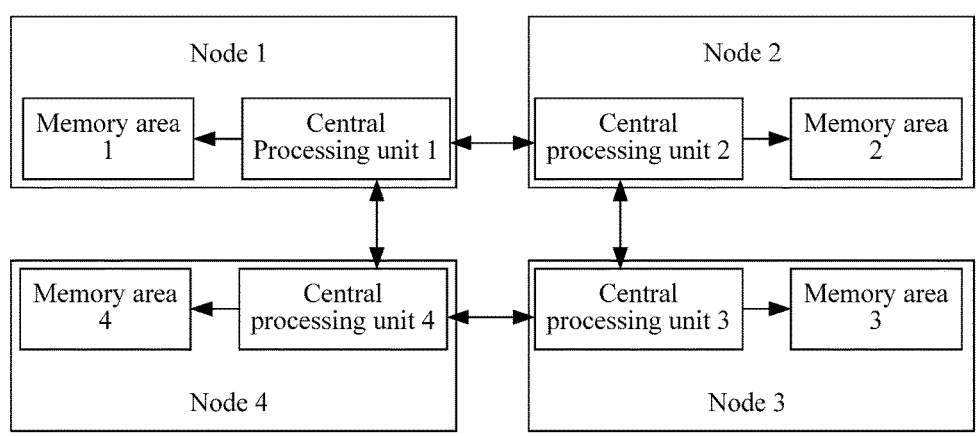
FIG. 1 is a schematic diagram of a NUMA system architecture.

A memory migration method provided in an embodiment of the present disclosure is applicable to a NUMA system architecture shown in FIG. 1, and also applicable to memory migration in another communications scenario (for example, in a NUMA system or in a virtualization scenario), which are not limited in the present disclosure. In the present disclosure, only memory migration in the NUMA system architecture shown in FIG. 1 is used as an example for description.

In the NUMA system architecture, an entire memory area of each node is divided into multiple memory pages, and a memory page is used as a smallest storage unit for data storage. Each memory page occupies approximately 4 kilobytes (KB) of physical memory, that is, consecutive physical addresses whose size is 4 KB are used to identify one memory page. For example, a memory page occupies consecutive physical addresses 00001000 to 00001FFF in a memory area.

Figure 3:
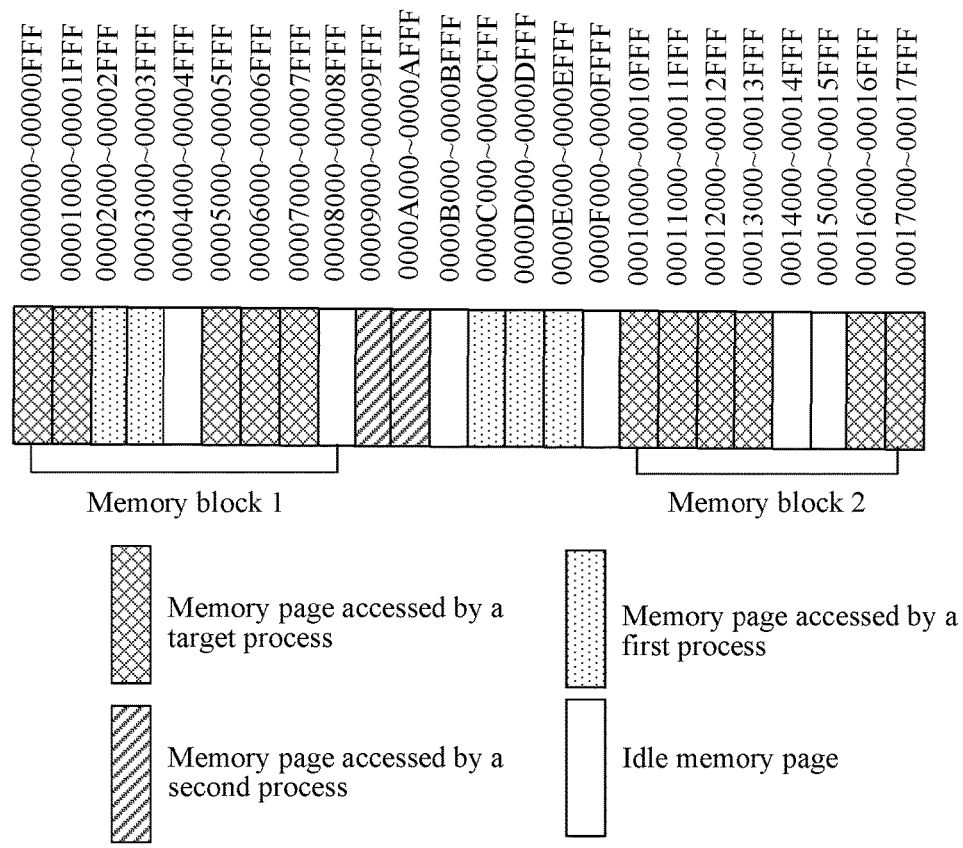
FIG. 3 is a schematic diagram of memory page combination in a memory area with a segment of consecutive physical addresses.

A CPU in each node may execute multiple processes, each process may access a memory page in a memory area of a local node (that is, a node on which the process is running) or another remote node in the NUMA system architecture, and memory pages accessed by a same process in a same memory area may be inconsecutive. For example, FIG. 3 is a schematic diagram of memory page combination in a memory area with a segment of consecutive physical addresses. As shown in FIG. 3, a memory area with a segment of addresses 00000000 to 00017FFF includes 24 memory pages, memory pages that are accessed by a target process, a first process, and a second process, and idle memory pages. The idle memory page is a memory page in which no data is stored in the memory area, that is, a memory page that is not used. It can be learnt from FIG. 3 that, in the memory area, there are eleven memory pages accessed by the target process, and the eleven memory pages are not entirely consecutive, and are separated by the memory pages accessed by the first process, the memory pages accessed by the second process, and the idle memory pages.

Figure 2:
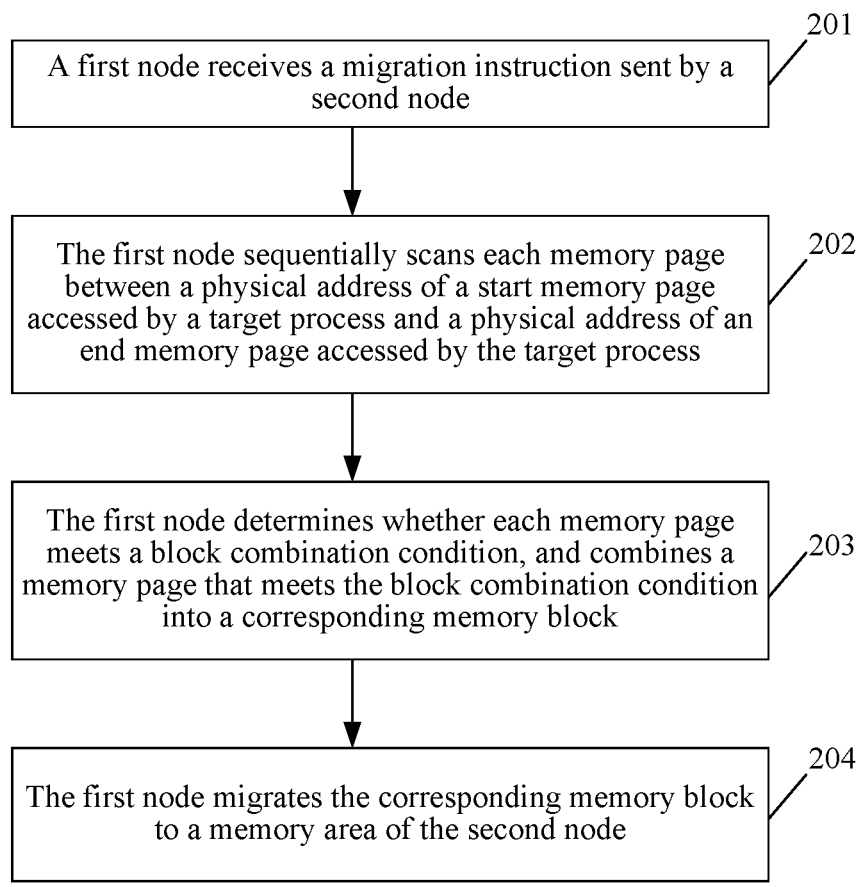
FIG. 2 is a flowchart of a memory migration method according to an embodiment of the present disclosure.

It is easily understood that, as shown in FIG. 3, if the memory pages accessed by the target process are migrated in a unit of memory page using a memory migration technology in the other approaches, eleven migrations are required, that is, a quantity of migrations is the same as a quantity of memory pages that need to be migrated. In this case, a relatively large quantity of memory migrations is caused if a large quantity of memory pages needs to be migrated. As a result, CPU processing efficiency of a node is low, and system performance deteriorates. In view of this, an embodiment of the present disclosure provides a memory migration method, which is applied to the NUMA system architecture shown in FIG. 1. As shown in FIG. 2, the method may include the following steps.

Step 201: A first node receives a migration instruction sent by a second node.

The migration instruction is used to instruct to migrate, from a memory area of the first node to a memory area of the second node, all memory pages located on the first node and accessed by a target process, where the target process is any process running on the second node.

The first node and the second node are any two different nodes in the NUMA architecture.

Step 202: The first node sequentially scans each memory page between a physical address of a start memory page accessed by a target process and a physical address of an end memory page accessed by the target process.

The memory page is a memory page accessed by the target process or a memory page accessed by a non-target process.

Preferably, the first node may learn, according to a mapping relationship that is between a virtual address and a physical address of a memory page accessed by a process and that is stored inside the system, a physical address of a memory page accessed by the target process, and sequentially scan, from the physical address of the start memory page accessed by the target process, each memory page between the physical address of the start memory page accessed by the target process and the physical address of the end memory page accessed by the target process, until the end memory page accessed by the target process is scanned.

For example, as shown in FIG. 3, the start memory page accessed by the target process is a memory page identified by consecutive physical addresses 00000000 to 00000FFF, and the end memory page accessed by the target process is a memory page identified by consecutive physical addresses 00017000 to 00017FFF. The first node sequentially scans, from the memory page identified by the consecutive physical addresses 00000000 to 00000FFF, each memory page in a memory area shown in FIG. 3, until the memory page identified by the consecutive physical addresses 00017000 to 00017FFF is scanned.

Step 203: The first node determines whether each memory page meets a block combination condition, and combines a memory page that meets the block combination condition into a corresponding memory block.

Preferably, the first node directly determines that a memory page meets the block combination condition when a scanned memory page is the memory page accessed by the target process.

The first node may determine, according to the following three situations (1), (2), and (3), whether a memory page accessed by the non-target process meets the block combination condition when a scanned memory page is the memory page accessed by the non-target process.

(1) If a memory page is an idle memory page, it is determined that the memory page meets the block combination condition.

(2) If a memory page is a memory page accessed by a first process, where the first process is a process, running on the second node, other than the target process, it is determined that the memory page meets the block combination condition.

(3) If a memory page is a memory page accessed by a second process, where the second process is a process running on a third node, and the third node is any node in the NUMA system architecture other than the first node and the second node, the first node queries a distance relationship table stored inside an operating system, where the distance relationship table records a distance at which the third node accesses the memory area of the first node, and a distance at which the third node accesses the memory area of the second node. The first node determines whether the distance at which the third node accesses the memory area of the second node is less than or equal to the distance at which the third node accesses the memory area of the first node, and the first node determines that the memory page meets the block combination condition if the distance at which the third node accesses the memory area of the second node is less than or equal to the distance at which the third node accesses the memory area of the first node, or if the distance at which the third node accesses the memory area of the second node is greater than the distance at which the third node accesses the memory area of the first node, it indicates that after a memory page accessed by the first process on the third node is migrated from the first node to the second node, an access time of the first process is excessively long, and system performance deteriorates. Therefore, the first node determines that the memory page does not meet the block combination condition.

The distance relationship table in the NUMA system architecture is stored in the operating system, where the distance relationship table includes a distance at which each global node accesses a memory area of a node, and is known to the global node, and the distance in the distance relationship table is fixed. For example, Table 1 is the distance relationship table stored in the NUMA system architecture shown in FIG. 1. As shown in Table 1, a distance at which the first node accesses a memory area of the third node is 21, and a distance at which the second node accesses the memory area of the third node is also 21, which indicate that a time taken by any process on the third node to access the memory area of the first node is the same as a time taken by the process on the third node to access the memory area of the second node. In this case, if a memory page that is located on the first node and accessed by the first process on the third node is migrated to the second node, processing performance of the first process is not affected.

TABLE 1

|  | Memory area of a first node | Memory area of a second node | Memory area of a third node | Memory area of a fourth node |
|---|---|---|---|---|
| First node | 10 | 21 | 21 | 20 |
| Second node | 21 | 10 | 21 | 21 |
| Third node | 21 | 21 | 10 | 21 |
| Fourth node | 20 | 21 | 21 | 10 |

Step 204: The first node migrates the corresponding memory block to a memory area of the second node.

Further, to avoid that an excessive quantity of memory pages included in each memory block causes excessively heavy load during memory block migration, for a first memory page, where the first memory page is any memory page, in the memory area of the first node, between the physical address of the start memory page accessed by the target process and the physical address of the end memory page accessed by the target process, if the first memory page meets the block combination condition, the first memory page that meets the block combination condition may be combined into the corresponding memory block using the following steps.

Step (I): Determine whether a quantity of memory pages included in a first memory block is less than a preset threshold, where the first memory block is a memory block to which a previous memory page adjacent to the first memory page belongs.

Step (II): Combine the first memory page into the first memory block if the quantity of memory pages included in the first memory block is less than the preset threshold, or perform step (III) or step (IV) according to a specific situation of the first memory page if the quantity of memory pages included in the first memory block is equal to the preset threshold.

Step (III): Skip combining the first memory page into the first memory block, and combine the first memory page used as a start memory page of a second memory block into the second memory block if the first memory page is a memory page accessed by the target process, or perform step (IV) if the first memory page is a memory page that meets the block combination condition and that is accessed by the non-target process.

Step (IV): Determine whether a second memory page is a memory page accessed by the target process, where the second memory page is a next memory page adjacent to the first memory page, and combine the second memory page used as a start memory page of a third memory block into the third memory block if the second memory page is a memory page accessed by the target process, or continue to sequentially scan the memory pages if the second memory page is not a memory page accessed by the target process, and combine the memory page used as a start memory page of a third memory block into the third memory block when a scanned memory page is a memory page accessed by the target process.

The preset threshold is preset as required and is not limited in this embodiment of the present disclosure. Preferably, the preset threshold may be any numerical value from 5 to 10.

Further, the first node skips combining the first memory page into the first memory block after scanning the first memory page, if the first node determines that the first memory page does not meet the block combination condition. In addition, the method may further include determining whether a second memory page is a memory page accessed by the target process, where the second memory page is a next memory page adjacent to the first memory page, and combining the second memory page used as a start memory page of a third memory block into the third memory block if the second memory page is a memory page accessed by the target process, or continuing to sequentially scan the memory pages if the second memory page is not a memory page accessed by the target process, and combining the memory page used as a start memory page of a third memory block into the third memory block when a scanned memory page is a memory page accessed by the target process.

It should be noted that, in this embodiment of the present disclosure, the start memory page that is accessed by the target process and that is used as a start page of the first memory block is directly combined into the first memory block.

The following describes the foregoing method using combination of memory pages between the start memory page accessed by the target process and the end memory page accessed by the target process in a memory area of the first node shown in FIG. 3. Each memory block is allowed to include ten memory pages, the first process runs on the third node, and the second process runs on the fourth node.

The start memory page accessed by the target process starts to be scanned from the physical addresses 00000000 to 00000FFF, and the memory page is combined into a memory block 1.

The second memory page with physical addresses 00001000 to 00001FFF is sequentially scanned. The second memory page is combined into the memory block 1 if the second memory page is a memory page accessed by the target process, and if a quantity of memory pages included in the memory block 1 is less than 10.

The third memory page (that is, a memory page accessed by the first process) with physical addresses 00002000 to 00002FFF is sequentially scanned. The third memory page is combined into the memory block 1 when the third memory page meets the block combination condition, according to the stored node distance relationship table (for example, Table 1), and when a quantity of memory pages included in the memory block 1 is less than 10.

The fourth memory page (that is, a memory page accessed by the first process) with physical addresses 00003000 to 00003FFF is sequentially scanned. The fourth memory page is combined into the memory block 1 when the fourth memory page meets the block combination condition, according to the stored node distance relationship table (for example, Table 1), and a quantity of memory pages included in the memory block 1 is less than 10.

The fifth memory page with physical addresses 00004000 to 00004FFF is sequentially scanned, where the fifth memory page is an idle memory page. The fifth memory page is combined into the memory block 1 if the fifth memory page meets the block combination condition, and a quantity of memory pages included in the memory block 1 is less than 10.

The sixth memory page with physical addresses 00005000 to 00005FFF is sequentially scanned. The sixth memory page is combined into the memory block 1 when the sixth memory page is a memory page accessed by the target process, and a quantity of memory pages included in the memory block 1 is less than 10.

Likewise, the seventh memory page with physical addresses 00006000 to 00006FFF and the eighth memory page with physical addresses 00007000 to 00007FFF are sequentially scanned, and the seventh memory page and the eighth memory page are both combined into the memory block 1.

The ninth memory page with physical addresses 00008000 to 00008FFF is sequentially scanned, where the ninth memory page is an idle memory page. The ninth memory page is combined into the memory block 1 when the ninth memory page meets the block combination condition, and a quantity of memory pages included in the memory block 1 is less than 10.

The tenth memory page (that is, a memory page accessed by the second process) with physical addresses 00009000 to 00009FFF is sequentially scanned. According to the stored node distance relationship table (for example, Table 1), when the ninth memory page does not meet the block combination condition, the ninth memory page is not combined into the memory block 1, and combination into the memory block 1 ends.

The eleventh memory page with physical addresses 0000A000 to 0000AFFF, the twelfth memory page with physical addresses 0000B000 to 0000BFFF, the thirteenth memory page with physical addresses 00000000 to 0000CFFF, the fourteenth memory page with physical addresses 0000D000 to 0000DFFF, the fifteenth memory page with physical addresses 0000E000 to 0000EFFF, and the sixteenth memory page with physical addresses 0000F000 to 0000FFFF are sequentially scanned. It is determined that none of the memory pages are memory pages accessed by the target process, and the memory pages cannot be used as a start memory page of a memory block 2.

The seventeenth memory page with physical addresses 00010000 to 00010FFF is sequentially scanned. The seventeenth memory page is used as the start memory page of the memory block 2, and memory pages start to be combined into the memory block 2 when the seventeenth memory page is a memory page accessed by the target process.

The eighteenth memory page with physical addresses 00011000 to 00011FFF is sequentially scanned. The eighteenth memory page is combined into the memory block 2 when the eighteenth memory page is a memory page accessed by the target process, and a quantity of memory pages included in the memory block 2 is less than 10.

Likewise, the nineteenth memory page with physical addresses 00012000 to 00012FFF and the twentieth memory page with physical addresses 00013000 to 00013FFF are both combined into the memory block 2.

The twenty-first memory page with physical addresses 00014000 to 00014FFF is sequentially scanned, where the twenty-first memory page is an idle memory page. The twenty-first memory page is combined into the memory block 2 if a quantity of memory pages included in the memory block 2 is less than 10.

The twenty-second memory page with physical addresses 00015000 to 00015FFF is sequentially scanned, where the twenty-second memory page is an idle memory page. The twenty-second memory page is combined into the memory block 2 if a quantity of memory pages included in the memory block 2 is less than 10.

The twenty-third memory page with physical addresses 00016000 to 00016FFF is sequentially scanned, where the twenty-third memory page is a memory page accessed by the target process. The twenty-third memory page is combined into the memory block 2 if a quantity of memory pages included in the memory block 2 is less than 10.

The twenty-fourth memory page with physical addresses 00017000 to 00017FFF is sequentially scanned, where the twenty-fourth memory page is the end memory page accessed by the target process. The twenty-fourth memory page is combined into the memory block 2 if a quantity of memory pages included in the memory block 2 is less than 10. At this time, a process of combining the memory pages ends.

It can be learnt from FIG. 3 that, after the foregoing process of combining the memory pages, the discrete memory pages accessed by the target process are combined into two memory blocks, the memory block 1 and the memory block 2. Therefore, only two migrations are required when memory migration is performed. Compared with a situation in which eleven memory page migrations are performed in the other approaches, a quantity of migrations is significantly reduced, and CPU utilization is improved.

It can be learnt from the foregoing description that, this embodiment of the present disclosure provides a memory migration method, where a first node receives a migration instruction sent by a second node, sequentially scans each memory page between a physical address of a start memory page accessed by a target process and a physical address of an end memory page accessed by the target process, where the memory page includes a memory page accessed by the target process or a memory page accessed by a non-target process, combines a memory page that meets a block combination condition into a corresponding memory block, and migrates the corresponding memory block to a memory area of the second node. In this way, memory pages accessed by the target process and memory pages that meet the block combination condition and that are accessed by the non-target process are combined into a memory block. Therefore, on the premise of not increasing performance costs of a system, discrete memory pages are combined together as many as possible for migration in a unit of memory block, which significantly reduces a quantity of memory migrations, and improves CPU utilization.

Figure 4:
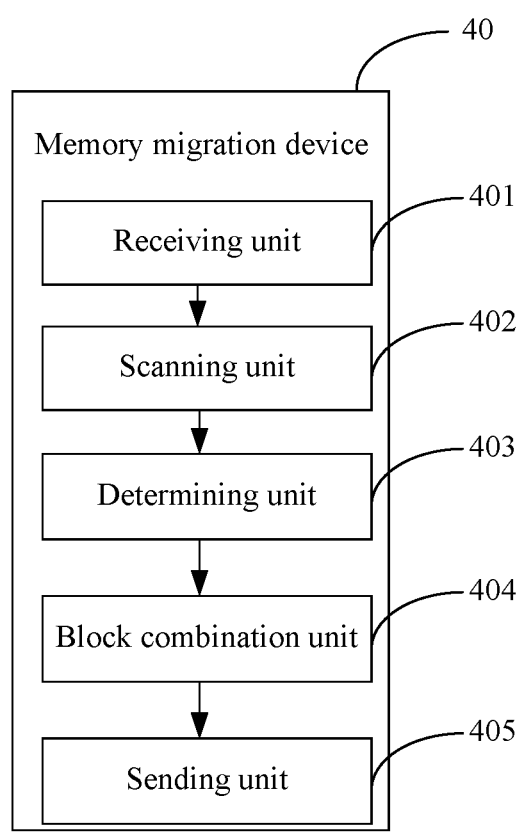
FIG. 4 is a schematic diagram of a memory migration device according to an embodiment of the present disclosure.

In addition, an embodiment of the present disclosure further provides a memory migration device 40 in FIG. 4, where the memory migration device 40 may be any node in the NUMA system architecture shown in FIG. 1. As shown in FIG. 4, the memory migration device 40 may include a receiving unit 401, a scanning unit 402, a determining unit 403, a block combination unit 404, and a sending unit 405.

The receiving unit 401 is configured to receive a migration instruction sent by a second node, where the migration instruction is used to instruct to migrate, from a memory area of a first node to a memory area of the second node, all memory pages located on the first node and accessed by a target process, and the target process is a process running on the second node.

The second node may be any node in the NUMA system architecture shown in FIG. 1 other than the first node.

The scanning unit 402 is configured to sequentially scan each memory page between a physical address of a start memory page accessed by the target process and a physical address of an end memory page accessed by the target process when the receiving unit 401 receives the migration instruction.

The memory page is a memory page accessed by the target process or a memory page accessed by a non-target process.

The determining unit 403 is configured to determine whether each memory page meets a block combination condition.

The block combination unit 404 is configured to combine a memory page that meets the block combination condition and that is determined by the determining unit 403 into a corresponding memory block.

The sending unit 405 is configured to migrate the corresponding memory block to the memory area of the second node.

Further, the scanning unit 402 is configured to learn, according to a mapping relationship that is between a virtual address and a physical address of a memory page accessed by a process and that is stored inside the system, a physical address of a memory page accessed by the target process, and sequentially scan, from the physical address of the start memory page accessed by the target process, each memory page between the physical address of the start memory page accessed by the target process and the physical address of the end memory page accessed by the target process, until the end memory page accessed by the target process is scanned.

Further, the determining unit 403 directly determines that a memory page meets the block combination condition when the memory page scanned by the scanning unit 402 is a memory page accessed by the target process.

The determining unit 403 is configured to determine, according to the following three situations (1), (2), and (3), whether a memory page meets the block combination condition when the memory page scanned by the scanning unit 402 is not a memory page accessed by the target process.

(1): If a memory page is an idle memory page, it is determined that the memory page meets the block combination condition.

(2): If a memory page is a memory page accessed by a first process, where the first process is a process, running on the second node, other than the target process, it is determined that the memory page meets the block combination condition.

(3): If a memory page is a memory page accessed by a second process, where the second process is a process running on a third node, and the third node is any node in the NUMA system architecture other than the first node and the second node, a distance relationship table stored inside an operating system is queried, where the distance relationship table records a distance at which the third node accesses the memory area of the first node, and a distance at which the third node accesses the memory area of the second node, whether the distance at which the third node accesses the memory area of the second node is less than or equal to the distance at which the third node accesses the memory area of the first node is determined, and it is determined that the memory page meets the block combination condition if the distance at which the third node accesses the memory area of the second node is less than or equal to the distance at which the third node accesses the memory area of the first node, or if the distance at which the third node accesses the memory area of the second node is greater than the distance at which the third node accesses the memory area of the first node, it indicates that after a memory page accessed by the first process on the third node is migrated from the first node to the second node, an access time of the first process is excessively long, and system performance deteriorates. Therefore, it is determined that the memory page does not meet the block combination condition.

The distance relationship table in the NUMA system architecture is stored in the operating system, where the distance relationship table includes a distance at which each global node accesses a memory area of a node, and is known to the global node, and the distance in the distance relationship table is fixed. For example, Table 1 is the distance relationship table stored in the NUMA system architecture shown in FIG. 1. As shown in Table 1, a distance at which the first node accesses a memory area of the third node is 21, and a distance at which the second node accesses the memory area of the third node is also 21, which indicate that a time taken by any process on the third node to access the memory area of the first node is the same as a time taken by the process on the third node to access the memory area of the second node. In this case, if a memory page that is located on the first node and accessed by the first process on the third node is migrated to the second node, processing performance of the first process is not affected.

Further, to avoid that an excessive quantity of memory pages included in each memory block causes excessively heavy load during memory block migration, for a first memory page, where the first memory page is any memory page, in the memory area of the first node, between the physical address of the start memory page accessed by the target process and the physical address of the end memory page accessed by the target process, when the determining unit 403 determines that the first memory page meets the block combination condition, the block combination unit 404 is configured to determine whether a quantity of memory pages included in a first memory block is less than a preset threshold, where the first memory block is a memory block to which a previous memory page adjacent to the first memory page belongs, combine the first memory page into the first memory block if the quantity of memory pages included in the first memory block is less than the preset threshold, or skip combining the first memory page into the first memory block, and combine the first memory page used as a start memory page of a second memory block into the second memory block if the quantity of memory pages included in the first memory block is equal to the preset threshold and the first memory page is a memory page accessed by the target process. Determine whether the second memory page is a memory page accessed by the target process if the first memory page is a memory page that meets the block combination condition and that is accessed by the non-target process, where the second memory page is a next memory page adjacent to the first memory page, and combine the second memory page used as a start memory page of a third memory block into the third memory block if the second memory page is a memory page accessed by the target process, or continue to sequentially scan the memory pages if the second memory page is not a memory page accessed by the target process, and combine the memory page used as a start memory page of a third memory block into the third memory block when a scanned memory page is a memory page accessed by the target process.

The preset threshold is preset as required and is not limited in this embodiment of the present disclosure. Preferably, the preset threshold may be any numerical value from 5 to 10.

Further, the block combination unit 404 skips combining the first memory page into the first memory block after the first memory page is scanned, and if the determining unit 403 determines that the first memory page does not meet the block combination condition. In addition, the determining unit 403 is further configured to determine whether a second memory page is a memory page accessed by the target process, where the second memory page is a next memory page adjacent to the first memory page.

The block combination unit 404 is further configured to combine the second memory page used as a start memory page of a third memory block into the third memory block if the second memory page is a memory page accessed by the target process, or continue to sequentially scan the memory pages if the second memory page is not a memory page accessed by the target process, and combine the memory page used as a start memory page of a third memory block into the third memory block when a scanned memory page is a memory page accessed by the target process.

It should be noted that, in this embodiment of the present disclosure, the start memory page that is accessed by the target process and that is used as a start page of the first memory block is directly combined into the first memory block.

It can be learnt from the foregoing description that, this embodiment of the present disclosure provides a memory migration device, which receives a migration instruction sent by a second node, sequentially scans each memory page between a physical address of a start memory page accessed by a target process and a physical address of an end memory page accessed by the target process, where the memory page includes a memory page accessed by the target process or a memory page accessed by a non-target process, combines a memory page that meets a block combination condition into a corresponding memory block, and migrates the corresponding memory block to a memory area of the second node. In this way, memory pages accessed by the target process and memory pages that meet the block combination condition and that are accessed by the non-target process are combined into a memory block. Therefore, on the premise of not increasing performance costs of a system, discrete memory pages are combined together as many as possible for migration in a unit of memory block, which significantly reduces a quantity of memory migrations, and improves CPU utilization.

Figure 5:
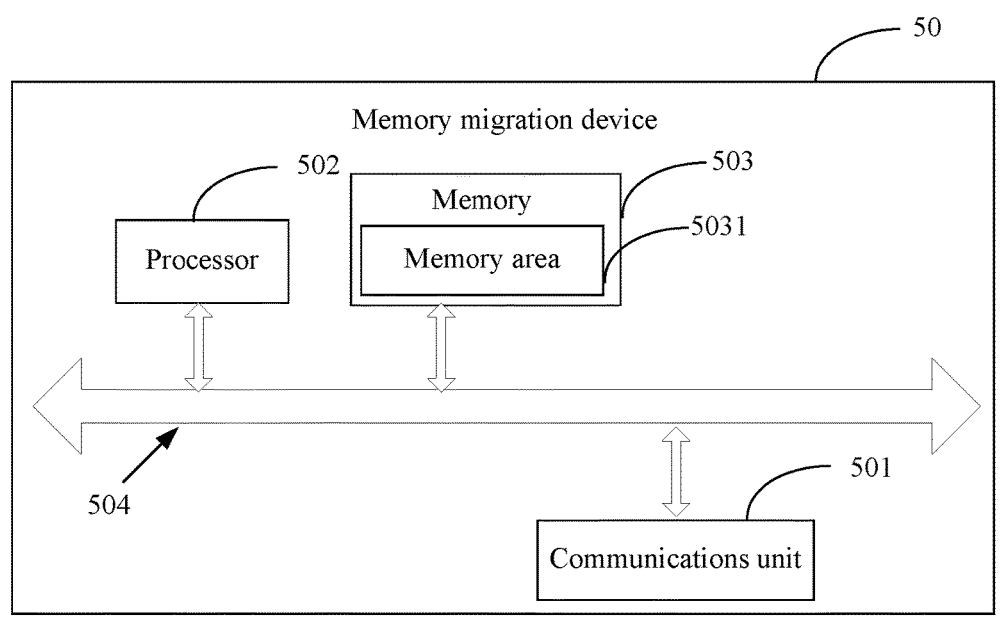
FIG. 5 is a schematic diagram of a memory migration device according to an embodiment of the present disclosure.

In addition, an embodiment of the present disclosure further provides a memory migration device 50 in FIG. 5, where the memory migration device 50 may be any node in the NUMA system architecture shown in FIG. 1. As shown in FIG. 5, the memory migration device 50 may include a communications unit 501, a processor 502, a memory 503, and at least one communications bus 504, where the communications unit 501 may be configured to perform data transmission with an external device or another node inside the NUMA system using the communications bus 504. The processor 502 may be a CPU inside a node, and the memory 503 may be a volatile memory, for example, a random access memory (RAM), or a non-volatile memory, for example, a read-only memory (ROM), a flash memory, a hard disk drive (HDD), or a solid-state drive (SSD), or a combination of the foregoing types of memories. The memory 503 gives an instruction to and provides data for the processor 502.

The memory 503 includes a memory area 5031 configured to give an instruction to and provide data for a process running on the processor 502.

The communications unit 501 is configured to receive a migration instruction sent by a second node, where the migration instruction is used to instruct to migrate, from a memory area of the first node to a memory area of the second node, all memory pages located on a first node and accessed by a target process, and the target process is a process running on the second node.

The second node may be any node in the NUMA system architecture shown in FIG. 1 other than the first node.

The processor 502 is configured to sequentially scan each memory page between a physical address of a start memory page accessed by the target process and a physical address of an end memory page accessed by the target process when the communications unit 501 receives the migration instruction, where the memory page is a memory page accessed by the target process or a memory page accessed by a non-target process, and determine whether each memory page meets a block combination condition, and combine a memory page that meets the block combination condition into a corresponding memory block.

The communications unit 501 is further configured to migrate the corresponding memory block obtained by the processor 502 to the memory area of the second node.

Further, the processor 502 is configured to learn, according to a mapping relationship that is between a virtual address and a physical address of a memory page accessed by a process and that is stored inside the system, a physical address of a memory page accessed by the target process, and sequentially scan, from the physical address of the start memory page accessed by the target process, each memory page between the physical address of the start memory page accessed by the target process and the physical address of the end memory page accessed by the target process, until the end memory page accessed by the target process is scanned.

Further, the processor 502 directly determines that a memory page meets the block combination condition when the memory page scanned by the processor 502 is a memory page accessed by the target process.

The processor 502 is configured to determine, according to the following three situations (1), (2), and (3), whether a memory page meets the block combination condition when the memory page scanned by the processor 502 is not a memory page accessed by the target process.

(1): If a memory page is an idle memory page, it is determined that the memory page meets the block combination condition.

(2): If a memory page is a memory page accessed by a first process, where the first process is a process running on the second node other than the target process, it is determined that the memory page meets the block combination condition.

(3): If a memory page is a memory page accessed by a second process, where the second process is a process running on a third node, and the third node is any node in the NUMA system architecture other than the first node and the second node, a distance relationship table stored inside an operating system is queried, where the distance relationship table records a distance at which the third node accesses the memory area of the first node, and a distance at which the third node accesses the memory area of the second node, whether the distance at which the third node accesses the memory area of the second node is less than or equal to the distance at which the third node accesses the memory area of the first node is determined, and it is determined that the memory page meets the block combination condition if the distance at which the third node accesses the memory area of the second node is less than or equal to the distance at which the third node accesses the memory area of the first node, or if the distance at which the third node accesses the memory area of the second node is greater than the distance at which the third node accesses the memory area of the first node, it indicates that after a memory page accessed by the first process on the third node is migrated from the first node to the second node, an access time of the first process is excessively long, and system performance deteriorates. Therefore, it is determined that the memory page does not meet the block combination condition.

The distance relationship table in the NUMA system architecture is stored in the operating system, where the distance relationship table includes a distance at which each global node accesses a memory area of a node, and is known to the global node, and the distance in the distance relationship table is fixed. For example, Table 1 is the distance relationship table stored in the NUMA system architecture shown in FIG. 1. As shown in Table 1, a distance at which the first node accesses a memory area of the third node is 21, and a distance at which the second node accesses the memory area of the third node is also 21, which indicate that a time taken by any process on the third node to access the memory area of the first node is the same as a time taken by the process on the third node to access the memory area of the second node. In this case, if a memory page that is located on the first node and accessed by the first process on the third node is migrated to the second node, processing performance of the first process is not affected.

Further, to avoid that an excessive quantity of memory pages included in each memory block causes excessively heavy load during memory block migration, for a first memory page, where the first memory page is any memory page, in the memory area of the first node, between the physical address of the start memory page accessed by the target process and the physical address of the end memory page accessed by the target process, when the processor 502 determines that the first memory page meets the block combination condition, the processor 502 is configured to determine whether a quantity of memory pages included in a first memory block is less than a preset threshold, where the first memory block is a memory block to which a previous memory page adjacent to the first memory page belongs, combine the first memory page into the first memory block if the quantity of memory pages included in the first memory block is less than the preset threshold, or if the quantity of memory pages included in the first memory block is equal to the preset threshold and the first memory page is a memory page accessed by the target process, skip combining the first memory page into the first memory block, and combine the first memory page used as a start memory page of a second memory block into the second memory block if the first memory page is a memory page that meets the block combination condition and that is accessed by the non-target process, determine whether the second memory page is a memory page accessed by the target process, where the second memory page is a next memory page adjacent to the first memory page, and combine the second memory page used as a start memory page of a third memory block into the third memory block if the second memory page is a memory page accessed by the target process, or continue to sequentially scan the memory pages if the second memory page is not a memory page accessed by the target process, and combine the memory page used as a start memory page of a third memory block into the third memory block when a scanned memory page is a memory page accessed by the target process.

The preset threshold is preset as required and is not limited in this embodiment of the present disclosure. Preferably, the preset threshold may be any numerical value from 5 to 10.

Further, after scanning the first memory page, if the processor 502 determines that the first memory page does not meet the block combination condition, the processor 502 skips combining the first memory page into the first memory block. In addition, the processor 502 is further configured to determine whether a second memory page is a memory page accessed by the target process, where the second memory page is a next memory page adjacent to the first memory page, and combine the second memory page used as a start memory page of a third memory block into the third memory block if the second memory page is a memory page accessed by the target process, or continue to sequentially scan the memory pages if the second memory page is not a memory page accessed by the target process, and combine the memory page used as a start memory page of a third memory block into the third memory block when a scanned memory page is a memory page accessed by the target process.

It should be noted that, in this embodiment of the present disclosure, the start memory page that is accessed by the target process and that is used as a start page of the first memory block is directly combined into the first memory block.

It can be learnt from the foregoing description that, this embodiment of the present disclosure provides a memory migration device, which receives a migration instruction sent by a second node, sequentially scans each memory page between a physical address of a start memory page accessed by a target process and a physical address of an end memory page accessed by the target process, where the memory page includes a memory page accessed by the target process or a memory page accessed by a non-target process, combines a memory page that meets a block combination condition into a corresponding memory block, and migrates the corresponding memory block to a memory area of the second node. In this way, memory pages accessed by the target process and memory pages that meet the block combination condition and that are accessed by the non-target process are combined into a memory block. Therefore, on the premise of not increasing performance costs of a system, discrete memory pages are combined together as many as possible for migration in a unit of memory block, which significantly reduces a quantity of memory migrations, and improves CPU utilization.

In the several embodiments provided in the present application, it should be understood that the disclosed system, device, and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the devices or units may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

Finally, it should be noted that the foregoing embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A memory migration method, comprising:
   receiving, by a first node, a migration instruction sent by a second node, wherein the migration instruction is used to instruct to migrate, from a memory area of the first node to a memory area of the second node, all memory pages located on the first node and accessed by a target process, and wherein the target process is a process running on the second node;
   sequentially scanning, by the first node, each memory page between a physical address of a start memory page accessed by the target process and a physical address of an end memory page accessed by the target process;
   determining, by the first node, whether each memory page meets a block combination condition;
   combining a memory page that meets the block combination condition into a corresponding memory block; and
   migrating, by the first node, the corresponding memory block to the memory area of the second node.

2. The method according to claim 1, wherein the memory page that meets the block combination condition comprises the memory page accessed by the target process.

3. The method according to claim 1, wherein the memory page that meets the block combination condition comprises an idle memory page.

4. The method according to claim 1, wherein the memory page that meets the block combination condition comprises a memory page accessed by a first process, and wherein the first process is another process, running on the second node, other than the target process.

5. The method according to claim 2, wherein when a memory page is a memory page accessed by a second process, wherein the second process is a process running on a third node, and wherein determining whether the memory page meets a block combination condition comprises:
   querying a distance relationship table stored inside an operating system, wherein the distance relationship table records a distance at which the third node accesses the memory area of the first node, and a distance at which the third node accesses the memory area of the second node;
   determining whether the distance at which the third node accesses the memory area of the second node is less than or equal to the distance at which the third node accesses the memory area of the first node; and
   determining that the memory page meets the block combination condition when the distance at which the third node accesses the memory area of the second node is less than or equal to the distance at which the third node accesses the memory area of the first node.

6. The method according to claim 5, wherein combining a first memory page into the corresponding memory block when the first memory page meets the block combination condition comprises:
   determining whether a quantity of memory pages comprised in a first memory block is less than a preset threshold;
   combining the first memory page into the first memory block when the quantity of memory pages comprised in the first memory block is less than the preset threshold; and
   combining the first memory page used as a start memory page of a second memory block into the second memory block when the quantity of memory pages comprised in the first memory block is equal to the preset threshold and the first memory page is the memory page accessed by the target process, wherein the first memory page is any memory page, in the memory area of the first node, between the physical address of the start memory page accessed by the target process and the physical address of the end memory page accessed by the target process, and wherein the first memory block is a memory block to which a previous memory page adjacent to the first memory page belongs.

7. The method according to claim 6, wherein when the first memory page does not meet the block combination condition, the method further comprises:
   determining whether a second memory page is the memory page accessed by the target process, wherein the second memory page is a next memory page adjacent to the first memory page; and
   combining the second memory page used as a start memory page of a third memory block into the third memory block when the second memory page is the memory page accessed by the target process.

8. The method according to claim 6, wherein a memory page is a memory page accessed by a non-target process and when the quantity of memory pages comprised in the first memory block is equal to the preset threshold and the first memory page is the memory page accessed by the non-target process, the method further comprises:
   determining whether a second memory page is the memory page accessed by the target process, wherein the second memory page is a next memory page adjacent to the first memory page; and
   combining the second memory page used as a start memory page of a third memory block into the third memory block when the second memory page is the memory page accessed by the target process.

9. The method according to claim 1, wherein when the memory page is a memory page accessed by a second process, wherein the second process is a process running on a third node, and wherein determining whether the memory page meets the block combination condition comprises:
   querying a distance relationship table stored inside an operating system, wherein the distance relationship table records a distance at which the third node accesses the memory area of the first node, and a distance at which the third node accesses the memory area of the second node;
   determining whether the distance at which the third node accesses the memory area of the second node is less than or equal to the distance at which the third node accesses the memory area of the first node; and
   determining that the memory page meets the block combination condition when the distance at which the third node accesses the memory area of the second node is less than or equal to the distance at which the third node accesses the memory area of the first node.

10. The method according to claim 9, wherein combining a first memory page into the corresponding memory block when the first memory page meets the block combination condition comprises:
    determining whether a quantity of memory pages comprised in a first memory block is less than a preset threshold;
    combining the first memory page into the first memory block when the quantity of memory pages comprised in the first memory block is less than the preset threshold; and
    combining the first memory page used as a start memory page of a second memory block into the second memory block when the quantity of memory pages comprised in the first memory block is equal to the preset threshold and the first memory page is the memory page accessed by the target process, wherein the first memory page is any memory page, in the memory area of the first node, between the physical address of the start memory page accessed by the target process and the physical address of the end memory page accessed by the target process, and wherein the first memory block is a memory block to which a previous memory page adjacent to the first memory page belongs.

11. The method according to claim 10, wherein when the first memory page does not meet the block combination condition, the method further comprises:
    determining whether a second memory page is the memory page accessed by the target process, wherein the second memory page is a next memory page adjacent to the first memory page; and
    combining the second memory page used as a start memory page of a third memory block into the third memory block when the second memory page is the memory page accessed by the target process.

12. The method according to claim 10, wherein a memory page is a memory page accessed by a non-target process and when the quantity of memory pages comprised in the first memory block is equal to the preset threshold and the first memory page is the memory page accessed by the non-target process, the method further comprises:
    determining whether a second memory page is the memory page accessed by the target process, wherein the second memory page is a next memory page adjacent to the first memory page; and
    combining the second memory page used as a start memory page of a third memory block into the third memory block when the second memory page is the memory page accessed by the target process.

13. The method according to claim 1, wherein combining a first memory page into the corresponding memory block when the first memory page meets the block combination condition comprises:
    determining whether a quantity of memory pages comprised in a first memory block is less than a preset threshold;
    combining the first memory page into the first memory block when the quantity of memory pages comprised in the first memory block is less than the preset threshold; and
    combining the first memory page used as a start memory page of a second memory block into the second memory block when the quantity of memory pages comprised in the first memory block is equal to the preset threshold and the first memory page is the memory page accessed by the target process, wherein the first memory page is any memory page, in the memory area of the first node, between the physical address of the start memory page accessed by the target process and the physical address of the end memory page accessed by the target process, and wherein the first memory block is a memory block to which a previous memory page adjacent to the first memory page belongs.

14. The method according to claim 13, wherein when the first memory page does not meet the block combination condition, the method further comprises:
    determining whether a second memory page is the memory page accessed by the target process, wherein the second memory page is a next memory page adjacent to the first memory page; and
    combining the second memory page used as a start memory page of a third memory block into the third memory block when the second memory page is the memory page accessed by the target process.

15. The method according to claim 13, wherein a memory page is a memory page accessed by a non-target process and when the quantity of memory pages comprised in the first memory block is equal to the preset threshold and the first memory page is the memory page accessed by the non-target process, the method further comprises:
   determining whether a second memory page is the memory page accessed by the target process, wherein the second memory page is a next memory page adjacent to the first memory page; and
   combining the second memory page used as a start memory page of a third memory block into the third memory block when the second memory page is the memory page accessed by the target process.

16. The method according to claim 2, wherein combining a first memory page into the corresponding memory block when the first memory page meets the block combination condition comprises:
   determining whether a quantity of memory pages comprised in a first memory block is less than a preset threshold;
   combining the first memory page into the first memory block when the quantity of memory pages comprised in the first memory block is less than the preset threshold; and
   combining the first memory page used as a start memory page of a second memory block into the second memory block when the quantity of memory pages comprised in the first memory block is equal to the preset threshold and the first memory page is the memory page accessed by the target process, wherein the first memory page is any memory page, in the memory area of the first node, between the physical address of the start memory page accessed by the target process and the physical address of the end memory page accessed by the target process, and wherein the first memory block is a memory block to which a previous memory page adjacent to the first memory page belongs.

17. The method according to claim 16, wherein when the first memory page does not meet the block combination condition, the method further comprises:
   determining whether a second memory page is the memory page accessed by the target process, wherein the second memory page is a next memory page adjacent to the first memory page; and
   combining the second memory page used as a start memory page of a third memory block into the third memory block when the second memory page is the memory page accessed by the target process.

18. The method according to claim 16, wherein a memory page is a memory page accessed by a non-target process and when the quantity of memory pages comprised in the first memory block is equal to the preset threshold and the first memory page is the memory page accessed by the non-target process, the method further comprises:
   determining whether a second memory page is the memory page accessed by the target process, wherein the second memory page is a next memory page adjacent to the first memory page; and
   combining the second memory page used as a start memory page of a third memory block into the third memory block when the second memory page is the memory page accessed by the target process.

19. A memory migration device, comprising:
   a receiver configured to receive a migration instruction sent by a second node, wherein the migration instruction is used to instruct to migrate, from a memory area of a first node to a memory area of the second node, all memory pages located on the first node and accessed by a target process, and wherein the target process is a process running on the second node;
   a processor coupled to the receiver and configured to:
      sequentially scan, according to the migration instruction received by the receiver, each memory page between a physical address of a start memory page accessed by the target process and a physical address of an end memory page accessed by the target process, wherein a memory page is a memory page accessed by the target process or a memory page accessed by a non-target process;
      determine whether each memory page meets a block combination condition;
      combine a memory page that meets the block combination condition into a corresponding memory block; and
   a transmitter coupled to the processor and configured to migrate the corresponding memory block to the memory area of the second node.

20. The memory migration device according to claim 19, wherein the memory page that meets the block combination condition comprises the memory page accessed by the target process.

21. The memory migration device according to claim 19, wherein the memory page that meets the block combination condition comprises:
   an idle memory page; or
   a memory page accessed by a first process, wherein the first process is another process, running on the second node, other than the target process.

22. The memory migration device according to claim 19, wherein when the memory page is a memory page accessed by a second process, and wherein the second process is a process running on a third node, the processor is further configured to:
   query a distance relationship table stored inside an operating system, wherein the distance relationship table records a distance at which the third node accesses the memory area of the first node, and a distance at which the third node accesses the memory area of the second node;
   determine whether the distance at which the third node accesses the memory area of the second node is less than or equal to the distance at which the third node accesses the memory area of the first node; and
   determine that the memory page meets the block combination condition when the distance at which the third node accesses the memory area of the second node is less than or equal to the distance at which the third node accesses the memory area of the first node.

23. The memory migration device according to claim 19, wherein when determining that a first memory page meets the block combination condition, the processor is further configured to:
   determine whether a quantity of memory pages comprised in a first memory block is less than a preset threshold;
   combine the first memory page into the first memory block when the quantity of memory pages comprised in the first memory block is less than the preset threshold; and
   combine the first memory page used as a start memory page of a second memory block into the second memory block when the quantity of memory pages comprised in the first memory block is equal to the preset threshold and the first memory page is the memory page accessed by the target process, wherein the first memory page is any memory page, in the memory area of the first node, between the physical address of the start memory page accessed by the target process and the physical address of the end memory page accessed by the target process, and wherein the first memory block is a memory block to which a previous memory page adjacent to the first memory page belongs.

24. The memory migration device according to claim 23, wherein when determining that the first memory page does not meet the block combination condition, or when determining that the quantity of memory pages comprised in the first memory block is equal to the preset threshold and the first memory page is the memory page accessed by the non-target process, the processor is further configured to:
   determine whether a second memory page is the memory page accessed by the target process, wherein the second memory page is a next memory page adjacent to the first memory page; and
   combine the second memory page used as a start memory page of a third memory block into the third memory block when the second memory page is the memory page accessed by the target process.

* * * * *

UNITED STATES PATENT AND TRADEMARK OFFICE
CERTIFICATE OF CORRECTION

PATENT NO. : 10,013,205 B2  
APPLICATION NO. : 15/357240  
DATED : July 3, 2018  
INVENTOR(S) : Lixing Chu Page 1 of 1

It is certified that error appears in the above-identified patent and that said Letters Patent is hereby corrected as shown below:

On the Title Page

Item (30), Line 1: "201410464534" should be "201410464534.X"

Signed and Sealed this  
Twenty-first Day of August, 2018

Andrei Iancu  
*Director of the United States Patent and Trademark Office*